United States Patent [19]
Suzuki et al.

[11] Patent Number: 6,050,897
[45] Date of Patent: Apr. 18, 2000

[54] ROTARY MANUAL CONTROLLER FOR USE WITH GAME MACHINE

[75] Inventors: Toshifumi Suzuki, Amagasaki; Yuusuke Fujimoto, Moriguchi, both of Japan

[73] Assignee: Konami Co., Ltd., Hyogo-ken, Japan

[21] Appl. No.: 09/200,351

[22] Filed: Nov. 9, 1998

[30] Foreign Application Priority Data

Dec. 5, 1997 [JP] Japan .................................. 9-335949

[51] Int. Cl.⁷ ....................................................... A63F 9/14
[52] U.S. Cl. ............................................................. 463/37
[58] Field of Search .......................... 273/148 B; 463/36, 463/37, 38, 47; 345/156; 434/29, 62

[56] References Cited

U.S. PATENT DOCUMENTS

| | | | |
|---|---|---|---|
| 3,647,210 | 3/1972 | Ratcliffe | 434/62 X |
| 3,939,580 | 2/1976 | Nakano et al. | 434/62 |
| 4,659,313 | 4/1987 | Kuster et al. | 273/148 B |
| 5,056,787 | 10/1991 | Mitsuyoshi | 273/148 B |
| 5,370,536 | 12/1994 | Chuang | 434/62 |
| 5,823,876 | 10/1998 | Unbehand | 463/37 |
| 5,829,745 | 11/1998 | Houle | 273/148 B |
| 5,868,573 | 2/1999 | Kerby et al. | 434/29 |

*Primary Examiner*—Releigh W. Chiu
*Attorney, Agent, or Firm*—Jordan and Hamburg LLP

[57] ABSTRACT

A rotary manual controller for use with a game machine has a steering wheel manually operable by the game player to rotate a shaft in one direction or the other between a neutral position and a manipulated position, for entering information about a game player's rotary control action to develop a game played on the game machine. The rotary manual controller includes a biasing mechanism for biasing the shaft to return to the neutral position, and a restricting mechanism for restricting angular movement of the shaft. The biasing mechanism has a cam of a partly elliptical, elongate rectangular shape concentrically mounted on the shaft, a pair of abutment members extending transversely across the shaft and held in slidable contact with respective cam surfaces of the cam, and a helical spring for biasing the abutment members into slidable contact with respective cam surfaces of the cam.

13 Claims, 8 Drawing Sheets

ROTARY MANUAL CONTROLLER FOR USE WITH GAME MACHINE

BACKGROUND OF THE INVENTION

1. Field of the Invention

The present invention relates to a rotary manual controller for use with a game machine for playing a competitive game with simulated racing cars, for example, to reflect a game player's rotary control action in the development of the competitive game played on the game machine.

2. Description of the Related Art

One conventional input device for use with game machines, for example, is a steering-wheel-type rotary manual controller including a steering wheel rotatable with a shaft. The game player turns the steering wheel in one direction or the other to enter control actions for playing the game on the game machine. The input device is usually combined with a game machine for playing a competitive game with simulated racing cars, for example.

The steering-wheel-type rotary manual controller comprises, in addition to the steering wheel mounted on one end of the shaft, a bearing by which the shaft is rotatably supported and a detector attached to the other end of the shaft for detecting an angular displacement of the steering wheel. While seeing the game as it proceeds on a display screen of the game machine, the game player turns the steering wheel through a desired angle in one direction. The angular displacement of the steering wheel is transmitted through the shaft and detected by the detector, and a signal generated by the detector is transmitted to an electronic control system in the game machine. Based on the signal supplied to the electronic control system, the electronic control system controls the game displayed on the display screen, e.g., moves a displayed game character in a corresponding direction in the displayed game.

With the conventional input device, the shaft which supports the steering wheel is freely rotatably supported by the bearing, and does not allow the game player to perceive physically the angle through which the steering wheel has been turned so far. The absence of a physical indication of the angular displacement of the steering wheel may possibly distract the game player's interest from the game.

One solution is to fit a helical spring over the shaft or connect an end of a helical spring to an arm projecting radially outwardly from the shaft, the helical spring being adjusted to exert no forces to the steering wheel when the steering wheel is in its neutral position. When the steering wheel is turned from the neutral position in one direction or the other, the helical spring exerts forces to the steering wheel for thereby resisting the turning of the steering wheel. Therefore, the game player who is gripping the steering wheel can sense the resistive forces applied from the helical spring to the steering wheel, and hence can physically perceive how much the steering wheel has been turned so far. Consequently, the game player is able to manipulate the steering wheel finely at well and become more interested in playing the game.

When the game player turns the steering wheel in one direction or the other, the resistive forces applied from the helical spring to the steering wheel increase or decrease progressively depending on the angular displacement of the steering wheel. With the progressively increasing or decreasing resistive forces, the game player finds it difficult to accurately spot the neutral position of the steering wheel.

SUMMARY OF THE INVENTION

It is therefore an object of the present invention to provide a rotary manual controller for use with a game machine, which is of a relatively simple structure capable of allowing the game player to physically perceive how much a manual rotary control member has been turned, and also allowing the game player to recognize when the rotary input device reaches a neutral position thereof, based on a click-like tactile sensation.

According to the present invention, a rotary manual controller for use with a game machine includes a casing, a shaft rotatably mounted in the casing for rotation about its own axis, a manual control member angularly movable with the shaft between a neutral position and a manipulated position, for reflecting a game player's rotary control action in the development of a game played on the game machine, a biased member concentrically fixedly mounted on the shaft, abutment means movably supported in the casing for movement in contact with the biased member, and biasing means coupled to the abutment means for biasing the abutment means into contact with the biased member, the biased member and the abutment means being held in contact with each other through a surface area shaped to develop a click-like tactile sensation for the game player through the manual control member when the manual control member is angularly moved between the neutral position and the manipulated position.

When the manual control member is manually turned by the game player, the shaft is turned about its own axis, causing the biased member to turn with the shaft while under biasing forces from the biasing means. Since the biased member and the abutment means are held in contact with each other through the surface area shaped to develop a click-like tactile sensation for the game player through the manual control member when the manual control member is angularly moved between the neutral position and the manipulated position, the game player can physically perceive whether the manual control member is in the neutral position or the manipulated position. Based on the physical perception, the game player can manipulate the manual control means precisely for the development of the game, and hence can find the game interesting.

The biased member comprises a cam having a cam surface, and the surface area comprises an arcuate surface of the cam surface which is convex radially outwardly and extends between spaced corners thereof, the arcuate surface being held in slidable contact with the abutment means.

When the manual control member is turned to turn the shaft from the neutral position until the abutment means is contacted by one of the corners, the abutment means is angularly displaced largely against the bias of the biasing means. The biasing forces applied from the biasing means to the manual control member are sharply increased, and the game player physically recognizes that the manual control member is displaced from the neutral position to the manipulated position based on the increase in the biasing forces, i.e., a click-like tactile sensation. When the manual control member is returned to return the shaft to the neutral position, the biasing forces applied from the biasing means to the manual control member are sharply reduced. As a result, the game player physically recognizes that the manual control member is displaced back to the neutral position from the manipulated position based on the reduction in the biasing forces, i.e., a click-like tactile sensation.

Since the cam is used to impart the biasing forces from the biasing means to the manual control member and also to develop a click-like tactile sensation, the rotary manual controller is relatively simple in structure, is made up of a relatively small number of parts, can be assembled through a relatively small number of steps, and can be manufactured relatively inexpensively.

Each of the corners comprises an angular corner. Inasmuch as the corners are angular corners, when the manual control member is turned to turn the shaft until the abutment means is contacted by one of the corners, the abutment means is angularly displaced largely by the angular corner. The game player now feels a sudden change in the biasing forces transmitted from the biasing means to the manual control member, and is given a distinct click-like tactile sensation through the manual control member.

The arcuate surface has an angular extent about the axis of the shaft equally on both sides of a spot which is substantially central on the cam surface transversely across the shaft and is held in contact with the abutment means when the manual control member is positioned in the neutral position.

As long as the manual control member is turned in a neutral range, the abutment means remains in contact with the arcuate surface through the angular extent. During this time, the manual control member is in an idling range in which it is subject to no biasing forces from the biasing means. In the idling range, the manual control member can be turned with light forces, allowing the game player to recognize that the manual control member is in the idling range. When the manual control member is turned out of the idling range, the biasing forces transmitted from the biasing means to the manual control member increase greatly as the abutment means is displaced largely by one of the corners of the cam. Consequently, the game player can recognize that the manual control member is turned out of the idling range based on a distinct click-like tactile sensation.

The cam surface includes a pair of flat surfaces extending tangentially from respective ends of the arcuate surface away from each other to the corners, respectively, of the cam surface. The cam surface further comprises a pair of side arcuate facets extending from respective ends of the arcuate surface away from each other, and flat facets extending from respective side arcuate facets to the corners, the side arcuate facets and the flat facets jointly providing recesses in the cam.

With this cam surface profile, the game player is allowed to recognize that the manual control member is turned into and out of the idling range based on a distinct click-like tactile sensation.

The abutment means comprises a pair of abutment members spaced from each other and disposed one on each side of the biased member, the biased member comprising a cam having a pair of cam surfaces, the surface area comprising respective arcuate surfaces of the cam surfaces which are convex radially outwardly and extend between spaced corners thereof, the arcuate surfaces being held in slidable contact with the abutment members, respectively.

Because the cam is sandwiched between the abutment members, forces imposed on the shaft by the abutment members cancel each other, and hence the shaft is free of localized forces perpendicular thereto. As a result, any bearing by which the shaft is supported can be simplified in structure.

Each of the abutment members extends transversely across the shaft and is longer than the cam surfaces, the abutment members being angularly movably supported at ends thereof for pivotal movement about pivot shafts parallel to the shaft, the biasing means comprising a helical spring coupled to and disposed between opposite ends of the abutment members.

With the above structure, insofar as the manual control member is turned the same angle clockwise and counterclockwise, the helical spring imposes the same biasing forces to the manual control member irrespective of whether the manual control member is turned either clockwise or counterclockwise.

The abutment members have respective straight surfaces held in slidable contact with the cam surfaces, respectively.

The straight surfaces of the abutment members are held in slidable contact with the arcuate surfaces of the cam surfaces when the manual control member is in the neutral position. As long as the straight surfaces of the abutment members are held in slidable contact with the arcuate surfaces of the cam surfaces, the biasing forces applied from the biasing means are not changed greatly, and the game player does not develop a click-like tactile sensation through the manual control member. Consequently, the manual control member can be operated idly insofar as the straight surfaces of the abutment members are held in slidable contact with the arcuate surfaces. The game player can feel highly realistic about the manner in which the manual control member, which is preferably a steering wheel, is operated idly, and thus finds the game interesting.

The rotary manual controller further comprises restricting means for restricting angular movement of the shaft. The restricting means comprises a stop lever fixedly mounted on the shaft and a stop lever engaging base mounted in the casing for engaging the stop lever.

Inasmuch as the restricting means restricts angular movement of the shaft, the game player is prevented from turning the manual control member excessively beyond a certain effective angular range, and also from damaging the rotary manual controller.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
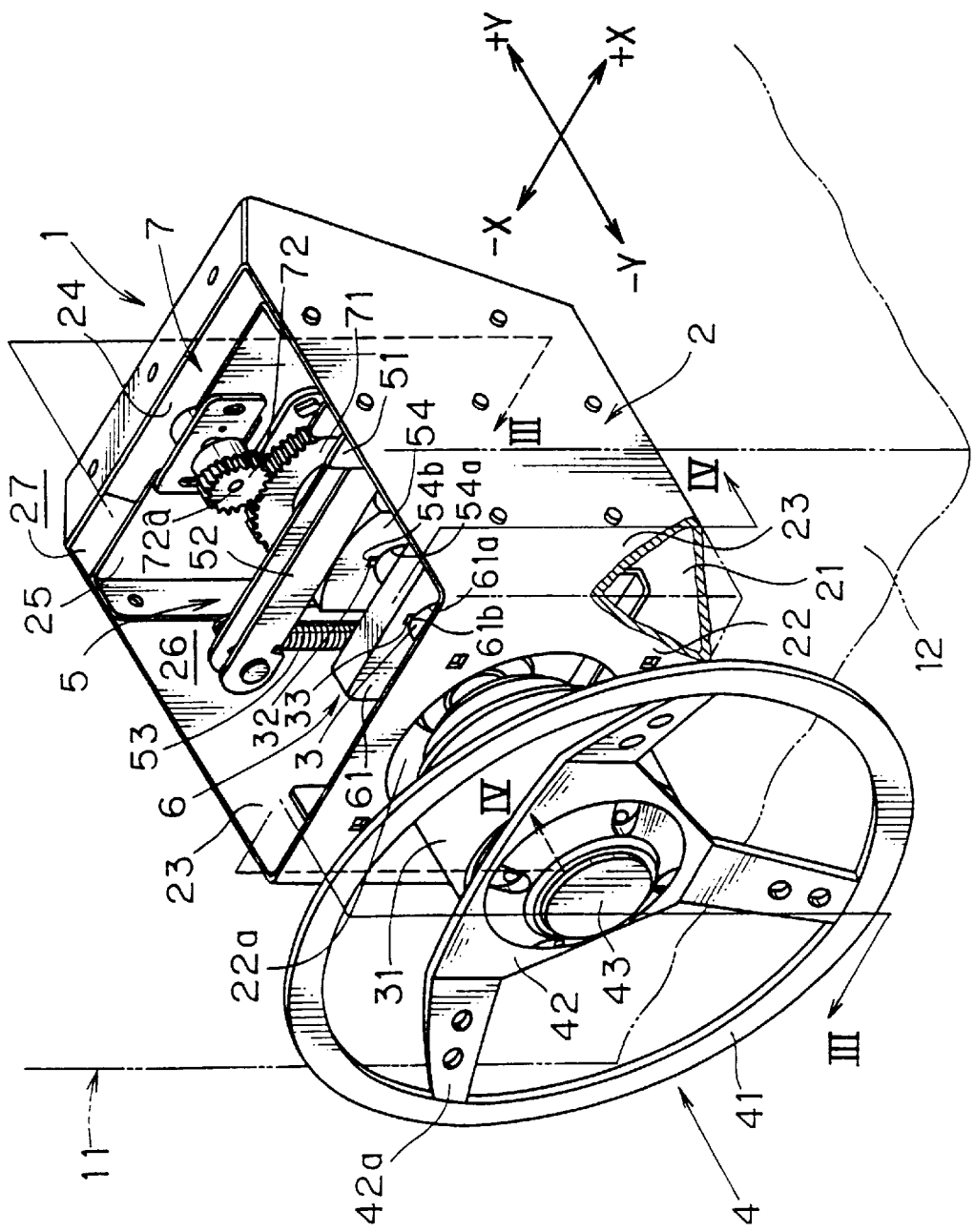
FIG. 1 is a perspective view, partly broken away, of a rotary manual controller according to the present invention.
Figure 2:
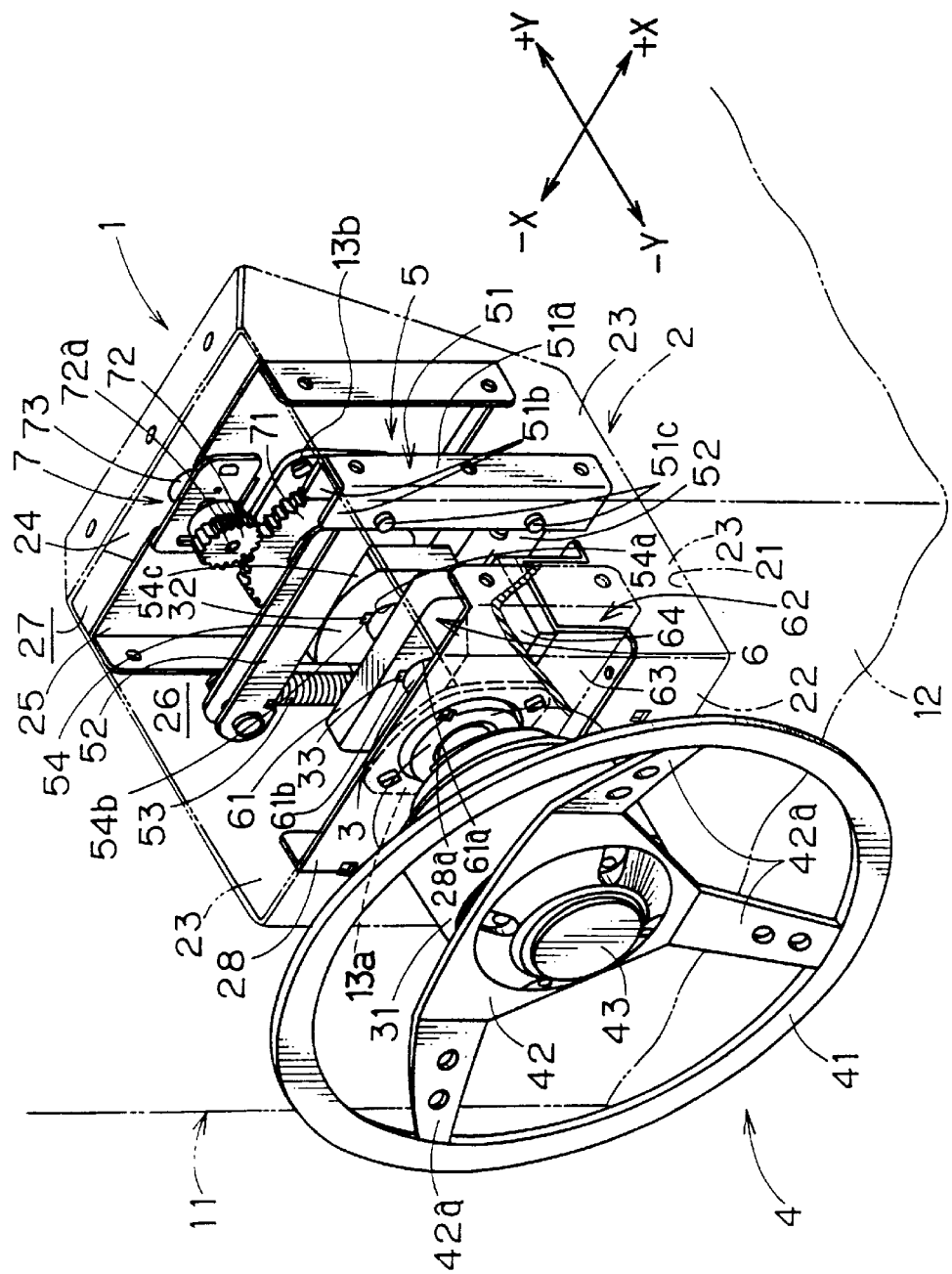
FIG. 2 is a perspective view, partly broken away, showing an internal structure of the rotary manual controller shown in FIG. 1.

FIGS. 1 and 2 show a rotary manual controller according to the present invention, which is used as an input device 1 for use with a game machine for playing a competitive game with simulated racing cars, for example. In FIGS. 1 and 2, the directions −X, +X are referred to as transverse directions, whereas the directions −Y, +Y are referred to as longitudinal directions. Particularly, the direction −X refers to a forward or front direction, the direction +X a rearward or rear direction, the direction −Y a leftward or left direction, and the direction +Y a rightward or right direction.

As shown in FIGS. 1 and 2, the input device 1 generally comprises a casing 2 disposed in a game machine housing 11 and mounted on a rear surface of a front panel 12 of the game machine housing 11 which faces the game player, a rotatable shaft 3 extending longitudinally through the casing 2, a steering wheel or manual control member 4 fixedly mounted on a front end of the shaft 3 projecting forwardly from the front panel 12, a biasing mechanism 5 disposed in the casing 2 for applying biasing forces to the steering wheel 4 as it is turned by the game player, a restricting mechanism 6 for restricting the angular movement of the shaft 3, and a detecting mechanism 7 for detecting how much the steering wheel 4 is turned, i.e., an angular displacement of the shaft 3 about its own axis.

The casing 2 is in the form of an upwardly open box which comprises a bottom plate 21, a front plate 22 extending upwardly from a front edge of the bottom plate 21, a pair of transversely spaced side plates 23 extending upwardly from transversely spaced side edges of the bottom late 21, and a rear plate 24 extending transversely between respective rear edges of the side plates 23. The front plate 22 has a circular through hole 22a defined therein through which the shaft 3 extends. The rear edges of the side plates 23 are slanted such that the side plates 23 have their longitudinal dimension progressively greater in the upward direction. Therefore, each of the side plates 23 is of an inverted trapezoidal shape.

A vertical partition plate 25 extends upwardly from the rear edge of the bottom plate 21 and is connected between the side plates 23. The space in the casing 2 is divided by the partition plate 25 into a front chamber 26 defined in front of the partition plate 25 and housing the biasing mechanism 5 and the restricting mechanism 6 therein, and a rear chamber 27 defined behind the partition plate 25 and housing a portion of the detecting mechanism 7.

Figure 3:
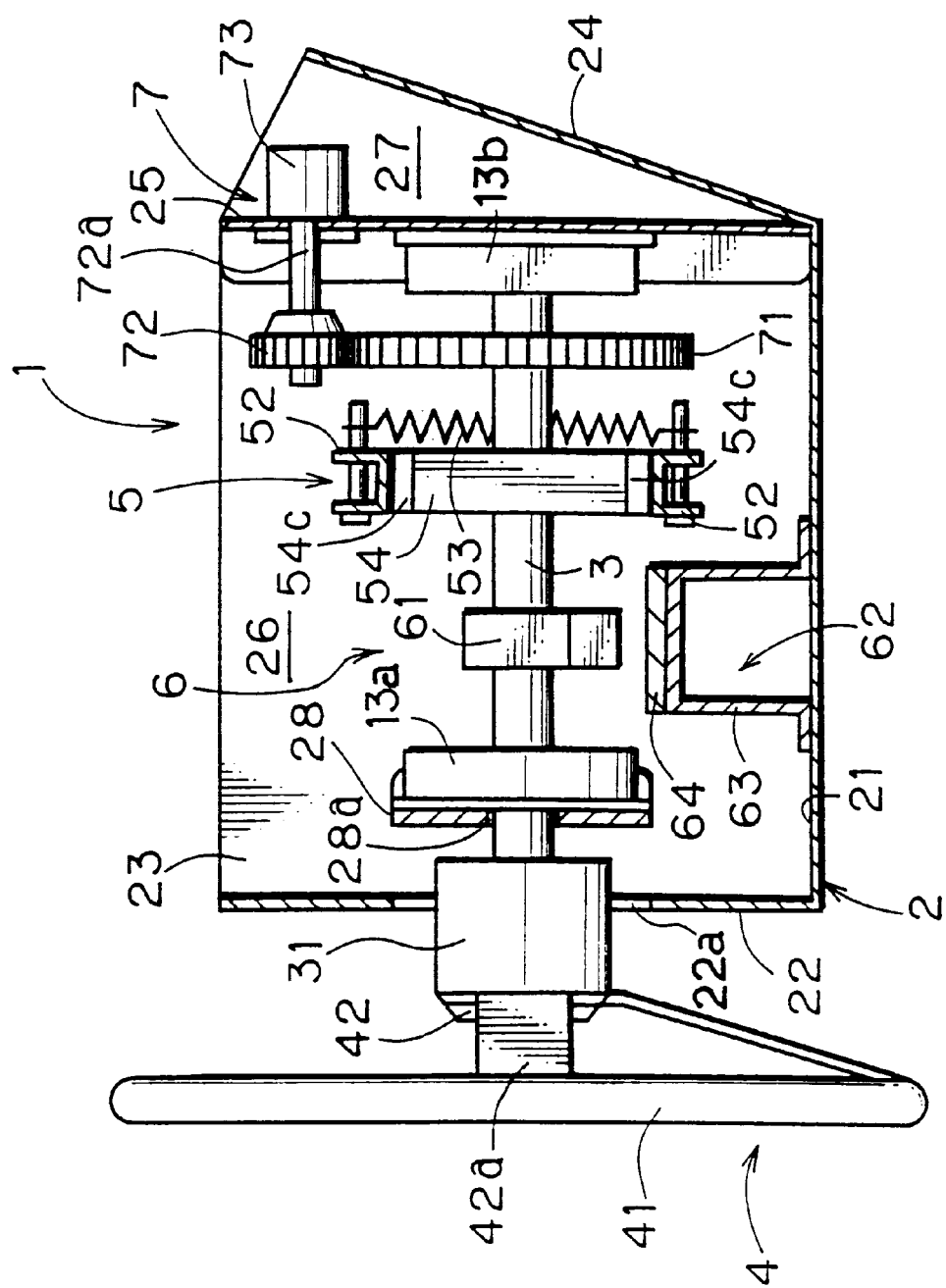
FIG. 3 is a cross-sectional view taken along line III—III of FIG. 1.

As shown in FIGS. 2 and 3, a vertical bearing plate 28 disposed in a front region of the front chamber 26 behind the front plate 22 and is connected between the side plates 23. The bearing plate 28 has a support hole 28a defined therein. A front bearing 13a is mounted on a rear surface of the bearing plate 28 coaxially with the circular support hole 28a and has a front end fitted in the circular support hole 28a. A rear bearing 13b is mounted on a front surface of the partition plate 25 coaxially with the front bearing 13a. The shaft 3 is rotatably supported by the front and rear bearings 13a, 13b for rotation about its own axis. The front end of the shaft 3 projects out of the casing 2 through the through hole 22a in the front plate 22. The steering wheel 4 is supported on a support tube 31 fitted over the projecting front end of the shaft 3 and secured thereto by a setscrew or the like.

The steering wheel 4 comprises an annular rim 41 which will be gripped by the game player, a T-shaped rim support spoke structure 42 integral with and positioned within the annular rim 41, and a holder disk 43 fixed to a central area of the rim support spoke structure 42. The rim support spoke structure 42 includes a plurality of bars or arms 42a having respective radially outer ends fixed to the annular rim 41, so that the annular rim 41 and the rim support spoke structure 42 are concentrically integral with other.

The rim support spoke structure 42 has a plurality of through holes defined at equally spaced intervals in an annular pattern in a central region thereof, and the holder disk 43 also has a plurality of through holes defined at equally spaced intervals in an annular pattern therein. Screws are inserted through these through holes in the rim support spoke structure 42 and the holder disk 43 and threaded into respective threaded holes defined in a front end of the support tube 31. The rim support spoke structure 42 and the holder disk 43 are thus fastened to the support tube 31, with the rim support spoke structure 42 being sandwiched between the holder disk 43 and the support tube 31. When the annular rim 41 is manually turned about its own axis by the game player, the shaft 3 is turned about its own axis with the steering wheel 4.

Figure 4:
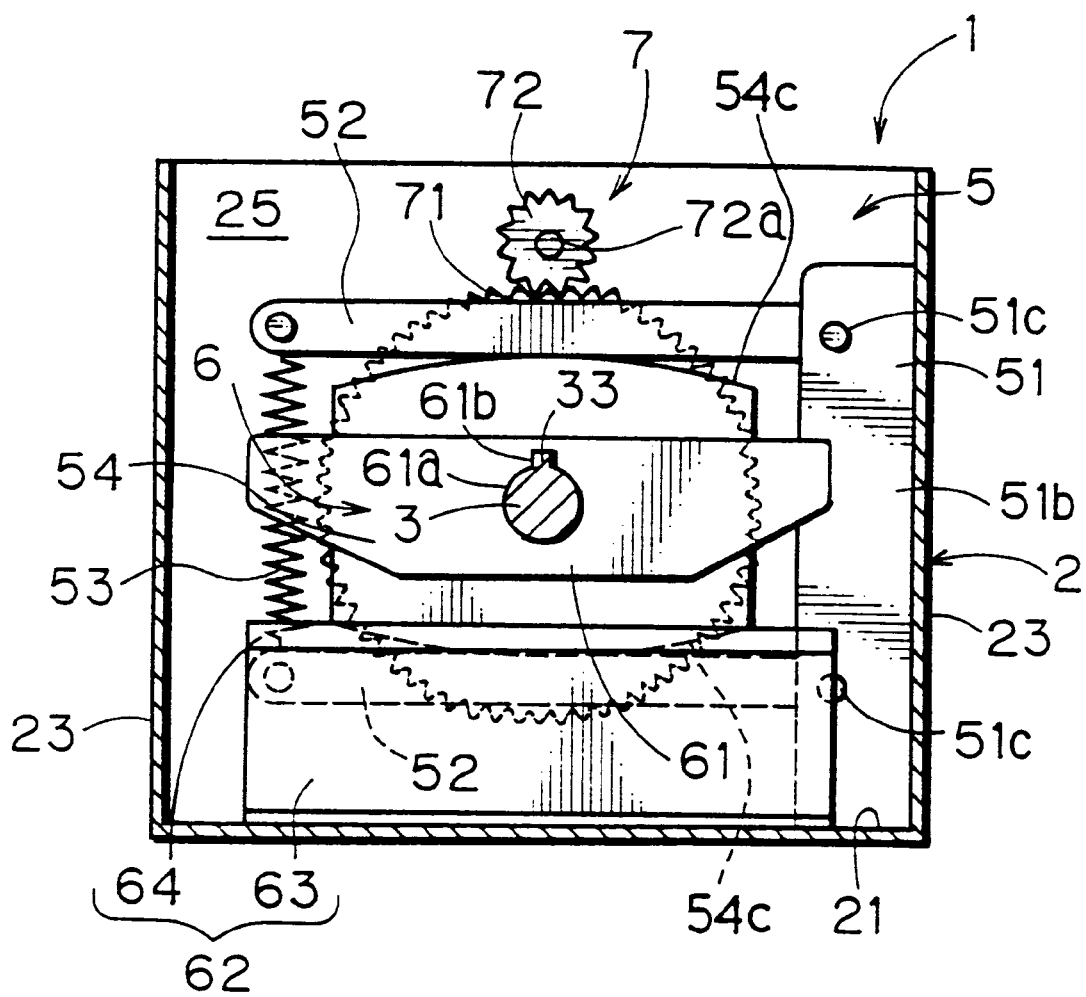
FIG. 4 is a cross-sectional view taken along line IV—IV of FIG. 1.

As shown in FIGS. 2 and 4, the biasing mechanism 5 comprises a cross-sectionally U-shaped pivot member 51 vertically mounted on the right end of a longitudinally central area of the bottom plate 21, a pair of vertically spaced, upper and lower transverse abutment members 52 pivotally supported at respective right ends thereof on respective upper and lower portions of the pivot member 51, a helical spring 53 joined vertically between right ends of the abutment members 52, and a cam 54 mounted concentrically on the shaft 3 between the abutment members 52 and having upper and lower cam surfaces slidably engaging respective flat straight surfaces of the abutment members 52, respectively. The upper and lower transverse abutment members 52 extend transversely across the shaft 3 and are longer than the cam 54.

The pivot member 51 comprises a vertical back plate 51a and a pair of front and rear pivot plates 51b bent at a right angle from respective front and rear edges of the back plate 51a to the left. The back plate 51a is fastened to an inner surface of a right one of the side plates 23 by screws. The right ends of the abutment members 52 fitted between the pivot plates 51b. Pivot shafts 51c extend through the pivot plates 51b and the abutment members 52 parallel to the shaft 3 and have opposite ends staked to keep the abutment members 52 pivotally supported on the pivot member 51 for angular movement about the pivot shafts 51c.

The cam 54 is of a partly elliptical, elongate rectangular shape as viewed in front elevation, i.e., along the shaft 3. The cam 54 has a through hole 54a defined centrally therein through which the shaft 3 extends and a slot 54b defined in an inner circumferential surface of the through hole 54a and extending along the shaft 3. The shaft 3 has an axial tooth 32 projecting from an outer circumferential surface thereof and fitted in the slot 54b in the cam 54. The tooth 32 has opposite ends staked on the cam 54. The cam 54 is thus fixedly mounted on the shaft 3 for rotation with the shaft 3.

The upper and lower cam surfaces of the cam 54 include respective upper and lower arcuate surfaces 54c which are convex radially outwardly. When the steering wheel 4 is in its neutral position, the upper and lower abutment members 52 engage the upper and lower arcuate surfaces 54c, respectively, while holding the cam 54 therebetween. At this time, the upper and lower abutment members 52 extend substantially parallel to each other.

When the steering wheel 4 is manually turned clockwise by the game player, the cam 54 is also turned clockwise, causing its upper left and lower right angular corners thereof to turn the upper and lower abutment members 52 away from each other about the respective pivot shafts 51c against the bias of the helical spring 53. Specifically, the upper left angular corner of the cam 54 angularly lifts the upper abutment member 52, and the lower right angular corner of the cam 54 angularly lowers the lower abutment member 52. At this time, biasing forces produced by the helical spring 53 depending on the angular displacement of the shaft 3 and hence the cam 54 are transmitted through the upper and lower abutment members 52, the cam 54, and the shaft 3 to the steering wheel 4.

Conversely, when the steering wheel 4 is manually turned counterclockwise by the game player, the cam 54 is also turned counterclockwise, causing its upper right and lower left angular corners thereof to turn the upper and lower abutment members 52 away from each other about the respective pivot shafts 51c against the bias of the helical spring 53. Specifically, the upper right angular corner of the cam 54 angularly lifts the upper abutment member 52, and the lower left angular corner of the cam 54 angularly lowers the lower abutment member 52. Biasing forces produced by the helical spring 53 are transmitted through the upper and lower abutment members 52, the cam 54, and the shaft 3 to the steering wheel 4. Since the cam 54 is sandwiched between the upper and lower abutment members 52 that are resiliently interconnected by the helical spring 53, when the steering wheel 4 is turned clockwise and counterclockwise through the same angle, the helical spring 53 exerts the same biasing forces to the steering wheel 4.

The restricting mechanism 6 comprises a stop lever 61 fixedly mounted on the shaft 3 and a stop lever engaging base 62 for engaging the stop lever 61. The stop lever 61 is in the form of a transversely elongate thick plate that is symmetrically in shape with respect to its center, and positioned on the shaft 3 slightly in front of the cam 54. The stop lever 61 has a through hole 61a defined centrally therein through which the shaft 3 extends and a slot 61b defined in an inner circumferential surface of the through hole 61a and extending along the shaft 3. The shaft 3 has an axial tooth 33 projecting from an outer circumferential surface thereof and fitted in the slot 61b in the stop lever 61. The tooth 33 has opposite ends staked on the stop lever 61. The stop lever 61 is thus fixedly mounted on the shaft 3 for rotation with the shaft 3.

The stop lever engaging base 62 comprises a cross-sectionally U-shaped channel 63 bent from a metal sheet and a stop lever engaging plate 64 fixedly mounted on the channel 63. The channel 63 has a pair of legs secured to the bottom plate 21, and extends transversely below the stop lever 61. The stop lever engaging plate 64 is fastened to an upper flat plate of the channel 63 by screws.

The stop lever engaging plate 64 has an upper surface slightly spaced downwardly from the stop lever 61 when the stop lever 61 lies horizontally. When the steering wheel 4 and hence the shaft 3 are turned in one direction or the other, the stop lever 61 is turned with the shaft 3, bringing a left or right end thereof into contact with the upper surface of the stop lever engaging plate 64 thereby to stop the angular displacement of the steering wheel 4 and hence the shaft 3. Therefore, the stop lever 61 cooperates with the stop lever engaging plate 64 in defining an angular range in which the shaft 3, i.e., the steering wheel 4, can be turned.

The detecting mechanism 7 comprises a large gear 71 fixedly mounted concentrically on the shaft 3 behind the cam 54, a small gear 72 mounted for corotation on a shaft 72a rotatably mounted longitudinally on the partition plate 25 and held in mesh with the large gear 71, and a rotary encoder 73 coupled to a rear end of the shaft 72a within the rear chamber 27 for detecting an angular displacement of the shaft 3 about its own axis.

Angular displacement of the shaft 3 caused by the steering wheel 4 is transmitted through the large gear 71, the small gear 72, and the shaft 72a to the rotary encoder 73. The rotary encoder 73 detects the number of revolutions of the shaft 72a for thereby detecting the angular displacement of the shaft 3 about its own axis, i.e., how much the steering wheel 4 has been turned. A signal from the rotary encoder 73, representative of how much the steering wheel 4 has been turned, is supplied to a control system (not shown) in the game machine housing 11 and used in a process of controlling the game played on the game machine.

Figure 5:
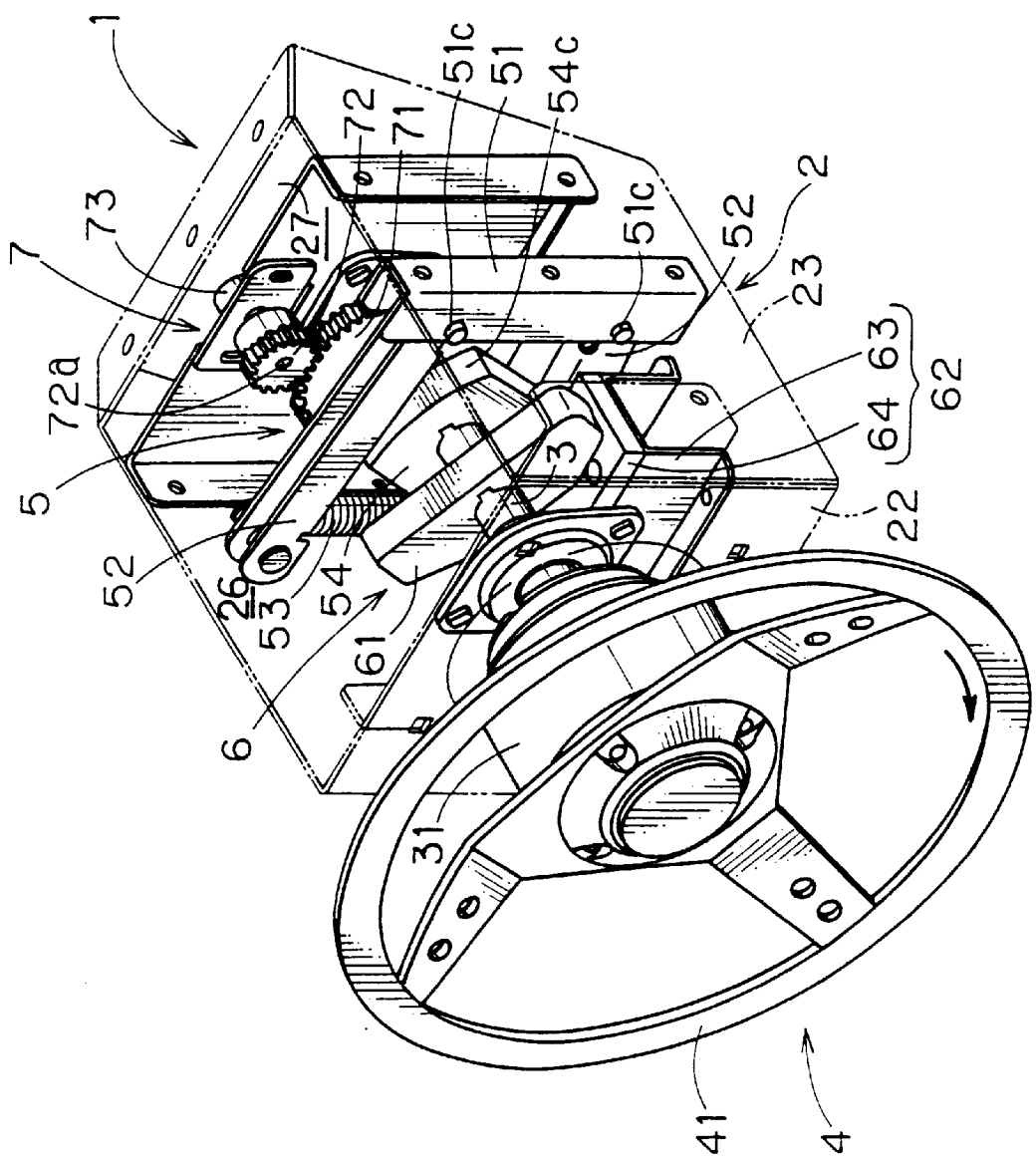
FIG. 5 is a perspective view of the rotary manual controller shown in FIG. 2, showing the position of the parts when a steering wheel of the rotary manual controller is turned clockwise.
Figure 6:
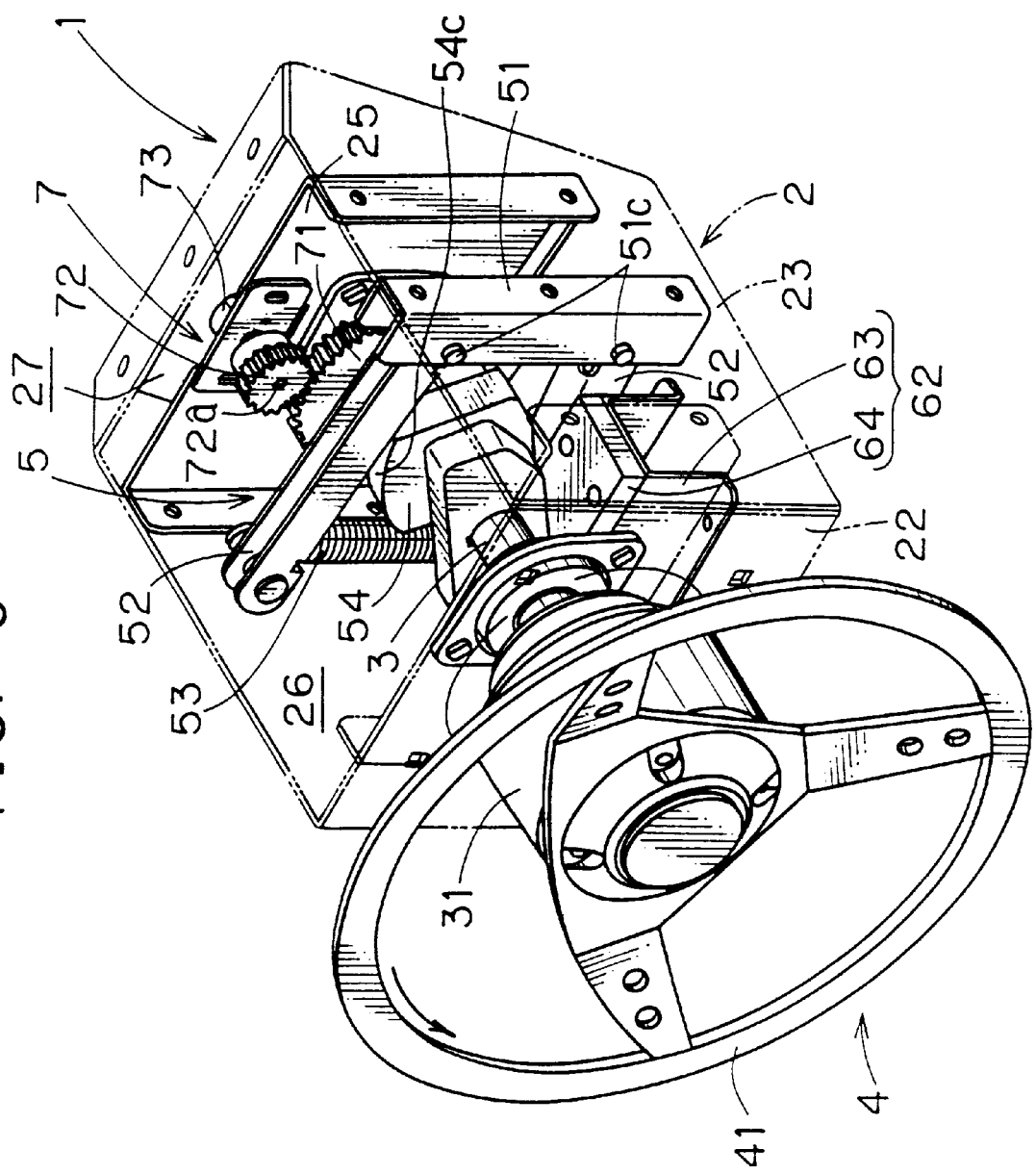
FIG. 6 is a perspective view of the rotary manual controller shown in FIG. 2, showing the position of the parts when a steering wheel of the rotary manual controller is turned counterclockwise.

FIG. 5 shows the position of the parts of the input device 1 when the steering wheel 4 is turned clockwise, and FIG. 6 shows the position of the parts of the input device 1 when the steering wheel 4 is turned counterclockwise. When the game player grips the rim 41 of the steering wheel 4 and turns it clockwise as shown in FIG. 5, the rotation of the rim 41 is transmitted through the rim support spoke structure 42, the holder disk 43, and the support tube 31 to the shaft 3, which is also turned clockwise about its own axis.

The cam 54 integral with the shaft 3 is also turned clockwise, causing the upper left angular corner of the cam 54 to engage and lift the upper abutment member 52 and the lower right angular corner of the cam 54 to engage and lower the lower abutment member 52. Therefore, the upper and lower abutment members 52 are turned away from each other about their respective pivot shafts 51c. The movement of the upper and lower abutment members 52 away from each other extends the helical spring 53 joined to the left ends of the upper and lower abutment members 52, increasing the biasing forces produced by the helical spring 53 depending on the angular displacement of the steering wheel 4. Since the increased biasing forces from the helical spring 53 are transmitted to the steering wheel 4, the game player physically recognizes the angular displacement of the steering wheel 4, i.e., how much the steering wheel 4 is turned.

When the game player turns the steering wheel 4 fully through its angular range to a clockwise allowable maximum position, the right end of the stop lever 61 engages the stop lever engaging plate 64, preventing the steering wheel 4 to be turned further clockwise.

When the game player turns the rim 41 counterclockwise as shown in FIG. 6, the upper right angular corner of the cam 54 engages and lifts the upper abutment member 52 and the lower left angular corner of the cam 54 engages and lowers the lower abutment member 52. Therefore, the helical spring 53 is extended, increasing the biasing forces produced by the helical spring 53. The increased biasing forces are transmitted from the helical spring 53 to the steering wheel 4, whereupon, the game player physically recognizes the angular displacement of the steering wheel 4. When the game player turns the steering wheel 4 fully through its angular range to a counterclockwise allowable maximum position, the left end of the stop lever 61 engages the stop lever engaging plate 64, preventing the steering wheel 4 to be turned further counterclockwise.

Figure 7A:
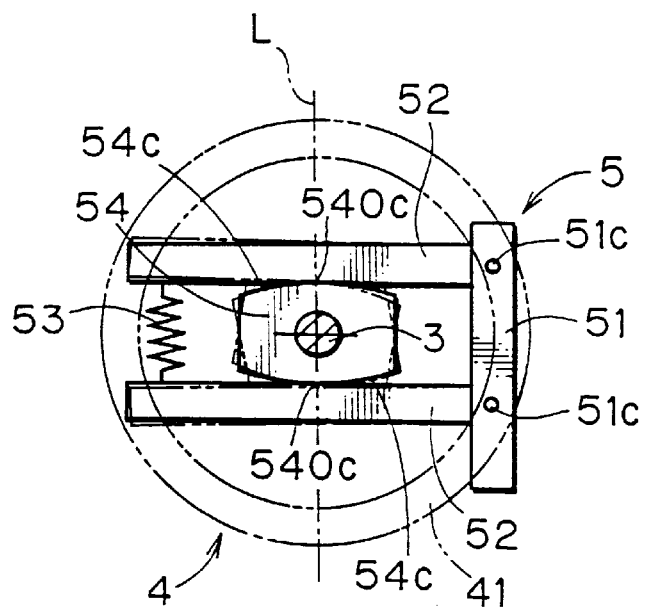
FIG. 7A is a front elevational view of a biasing mechanism of the rotary manual controller, showing a cam as it is in a neutral position.
Figure 7B:
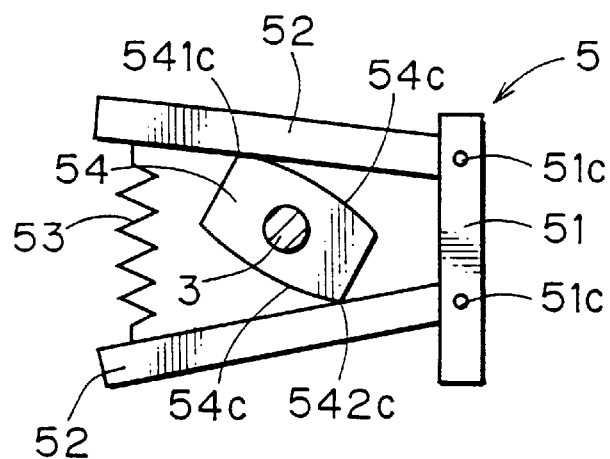
FIG. 7B is a front elevational view of the biasing mechanism of the rotary manual controller, showing the cam as it is turned clockwise from the neutral position against the bias of a helical spring.
Figure 7C:
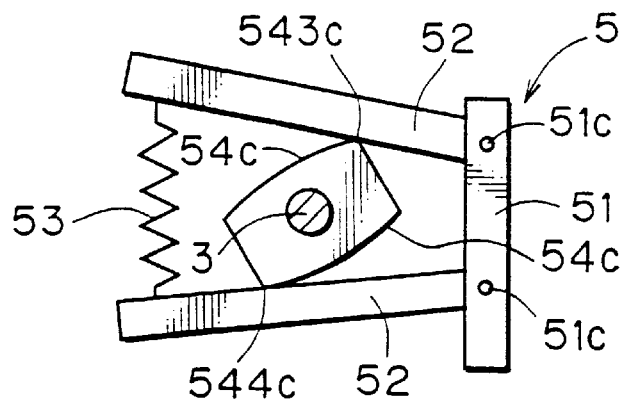
FIG. 7C is a front elevational view of the biasing mechanism of the rotary manual controller, showing the cam as it is turned counterclockwise from the neutral position against the bias of the helical spring.

FIGS. 7A through 7C show the relationship between the positional changes of the abutment members 52 and the biasing forces of the helical spring 53. Specifically, FIG. 7A shows the cam 54 as it is in its neutral position, FIG. 7B shows the cam 54 as it is turned clockwise from the neutral position against the bias of the helical spring 53, and FIG. 7C shows the cam 54 as it is turned counterclockwise from the neutral position against the bias of the helical spring 53.

When the steering wheel 4 is held in the neutral position, as shown in FIG. 7A, the cam 54 is also held in the neutral position in which the cam 54 is horizontally symmetrical with respect to a dot-and-dash vertical line L passing through the axis of the shaft 3. The upper and lower arcuate surfaces 54c of the cam 54 have respective transversely central spots 540c kept in contact with the respective upper and lower abutment members 52 that are being urged toward each other under the bias of the helical spring 53.

Insofar as the game player turns the rim 41 in one direction or the other within a neutral range or idling range where the upper and lower arcuate surfaces 54c of the cam 54 are held in contact with the respective upper and lower abutment members 52, as indicated by the two-dot-and-dash lines in FIG. 7A, the upper and lower abutment members 52 are slightly turned about the respective pivot shafts 51c, slightly increasing the biasing forces produced by the helical spring 53. However, since the upper and lower arcuate surfaces 54c of the cam 54 remain in contact with the respective upper and lower abutment members 52, the increased biasing forces produced by the helical spring 53 and applied to the steering wheel 4 are not large compared with the angular displacement of the steering wheel 4. In this neutral range, the game player 4 can turn the steering wheel 4 with light forces, and can recognize that the steering wheel 4 is in the neutral range or idling range.

When the game player turns the steering wheel 4 clockwise beyond the neutral range, as shown in FIG. 7B, the upper left angular corner, denoted by 541c, of the cam 54 engages and lifts the upper abutment member 52 and the lower right angular corner, denoted by 542c, of the cam 54 engages and lowers the lower abutment member 52. The upper abutment member 52 is lifted a distance much greater than the distance by which it was lifted when the steering wheel 4 was turned in the neutral range as shown in FIG. 7A, and similarly the lower abutment member 52 is lifted a distance much greater than the distance by which it was lowered when the steering wheel 4 was turned in the neutral range as shown in FIG. 7A. Accordingly, when the steering wheel 4 is turned beyond its neutral range, the biasing forces applied from the helical spring 53 to the steering wheel 4 are increased greatly, enabling the game player to physically perceive that the steering wheel 4 has been turned beyond its neutral range or idling range.

When the game player turns the steering wheel 4 counterclockwise beyond the steering range, as shown in FIG. 7C, the upper right angular corner, denoted by 543c, of the cam 54 engages and lifts the upper abutment member 52 and the lower right angular corner, denoted by 544c, of the cam 54 engages and lowers the lower abutment member 52. At this time, the biasing forces applied from the helical spring 53 to the steering wheel 4 are also increased greatly, enabling the game player to physically perceive that the steering wheel 4 has been turned beyond its neutral range or idling range.

Since the cam 54 is always sandwiched between the upper and lower abutment members 52, the moment which is imposed on the cam 54 by the helical spring 53 while the upper left angular corner 541c of the cam 54 is engaging the upper abutment member 52 and the lower right angular corner 542c of the cam 54 is engaging the lower abutment member 52 upon clockwise movement of the steering wheel 4, and the moment which is imposed on the cam 54 by the helical spring 53 while the upper right angular corner 543c of the cam 54 is engaging the upper abutment member 52 and the lower right angular corner 544c of the cam 54 is engaging the lower abutment member 52 upon counterclockwise movement of the steering wheel 4 are equal to each other insofar as the steering wheel 4 is turned clockwise and counterclockwise through the same angle. Consequently, the steering wheel 4 is subject to the same biasing forces from the helical spring 53 regardless of the direction in which the steering wheel 4 is turned.

Figure 8:
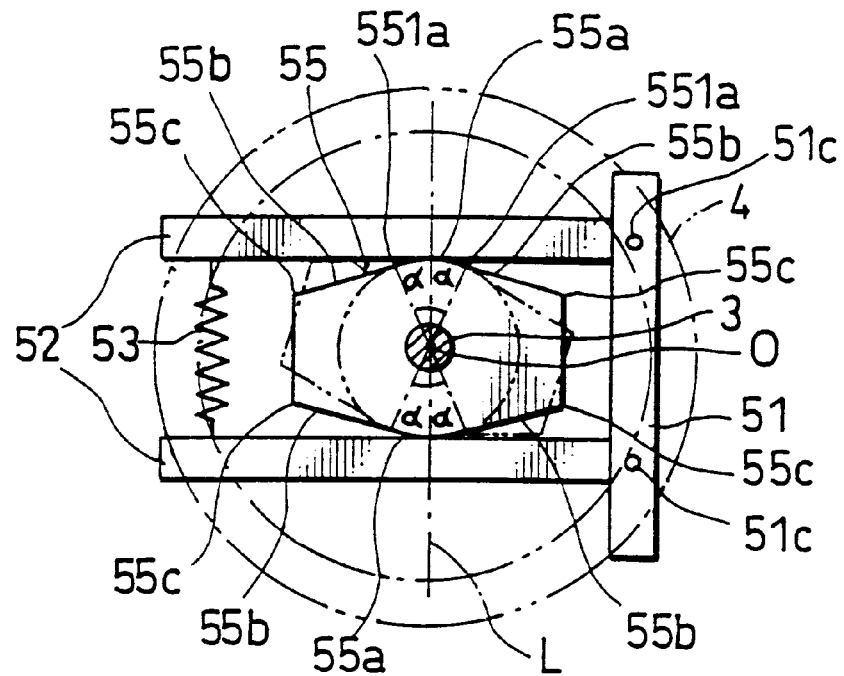
FIG. 8 is a front elevational view of a biasing mechanism having a cam according to another embodiment of the present invention.

FIG. 8 shows a biasing mechanism having a cam 55 according to another embodiment of the present invention. Those parts of the biasing mechanism shown in FIG. 8 which are identical to the biasing mechanism 5 shown FIGS. 1 through 7A–7C are denoted by identical reference characters, and will not be described in detail below.

As shown in FIG. 8, the cam 55 has, on each of its upper and lower cam surfaces, a central arcuate surface 55a extending about the axis O of the shaft 3 and a pair of flat straight surfaces 55b extending tangentially from respective ends 551a of the central arcuate surface 55a away from each other to respective outer angular corners 55c of the cam surface. With the steering angle 4 in the neutral position, a straight line extending from the axis O of the shaft 3 to one of the ends 551a of the central arcuate surface 55a is angularly spaced an angle $\alpha$ from the vertical line L passing through the axis O of the shaft 3, and a straight line extending from the axis O of the shaft 3 to the other one of the ends 551a of the central arcuate surface 55a is also angularly spaced the same angle $\alpha$ from the vertical line L passing through the axis O of the shaft 3. Therefore, even when the steering wheel 4 is turned within the angle $\alpha$ either clockwise or counterclockwise from the neutral position, the distance between the upper and lower abutment members 52 remains unchanged. Accordingly, insofar as the steering wheel 4 is turned within the angle $\alpha$ either clockwise or counterclockwise from the neutral position, the steering wheel 4 is idling with no biasing forces applied thereto from the helical spring 53.

When the steering wheel 4 is turned the angle $\alpha$ either clockwise or counterclockwise from the neutral position, the flat surfaces 55b, one on each of the upper and lower cam surfaces, are brought into contact with the upper and lower abutment members 52. Further turning of the steering wheel 4 causes the corresponding angular corners 55c, which are symmetric with respect to the axis O of the shaft 3, to spread the upper and lower abutment members 52 away from each other against the bias of the helical spring 53. The biasing forces from the helical spring 53 are now increased and applied to the steering wheel 4. Therefore, the game player can physically recognize the angular displacement of the steering wheel 4 beyond the angle $\alpha$ based on a click-like tactile sensation imparted by a sudden increase in the biasing forces from the helical spring 53.

When the steering wheel 4 is returned from an angular displacement beyond the angle $\alpha$ back to the idling angular displacement within the angle $\alpha$, since the biasing forces applied to the steering wheel 4 by the helical spring 53 are suddenly eliminated. Consequently, the game player can also physically recognize the return of the steering wheel 4 to the idling angular displacement within the angle α based on a click-like tactile sensation imparted by a sudden elimination of the biasing forces from the helical spring 53.

The arcuate surfaces 55a on the upper and lower cam surfaces of the cam 55, each angularly extending the angle α-7C are denoted by identical reference characters, and will not be described in detail below.

Figure 9:
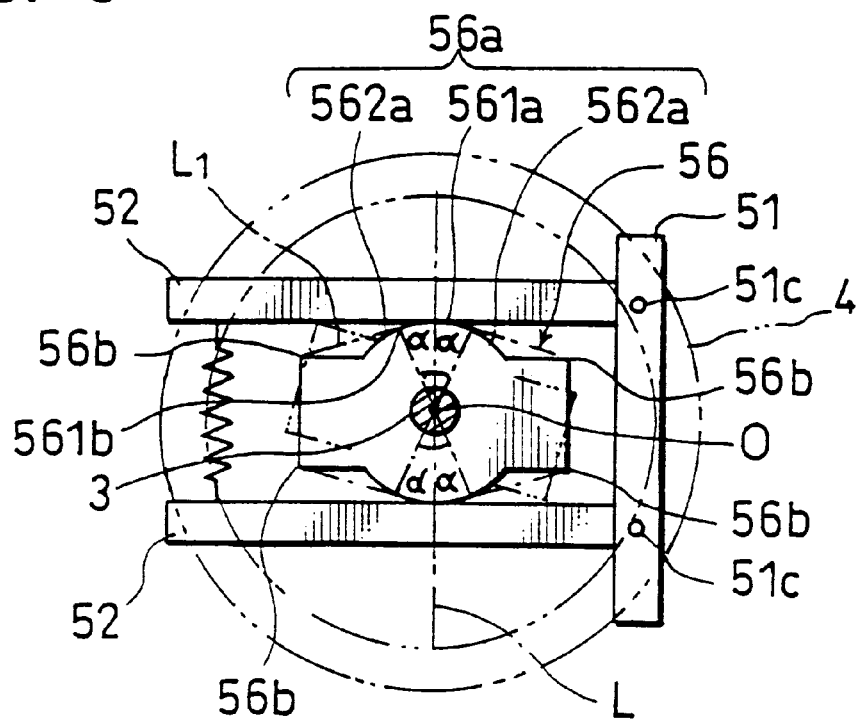
FIG. 9 is a front elevational view of a biasing mechanism having a cam according to still another embodiment of the present invention.

The cam 56 shown in FIG. 9 is similar to the cam 55 shown in FIG. 8 except that the cam 56 has, on each of its upper and lower cam surfaces, an arcuate surface 56a extending about the axis O of the shaft 3, and the arcuate surface 56a comprises a central arcuate surface 561a and a pair of side arcuate facets 562a extending from the central arcuate surface 561a away from each other. With the steering angle 4 in the neutral position, a straight line extending from the axis O of the shaft 3 to one of the ends of the central arcuate surface 561a is angularly spaced an angle α from the vertical line L passing through the axis O of the shaft 3, and a straight line extending from the axis O of the shaft 3 to the other one of the ends of the central arcuate surface 561a is also angularly spaced the same angle α from the vertical line L passing through the axis O of the shaft 3. Each of the upper and lower cam surfaces of the cam 56 has outer angular corners 56b that are positioned on imaginary straight lines L1 which extend tangentially to boundary points 561b between the central arcuate surface 561a and the side arcuate facets 562a. The side arcuate facets 562a and flat straight facets extending from their ends to the outer angular corners 56b provide recesses in the upper and lower cam surfaces of the cam 56 within the tangential lines L1.

The cam 56 shown in FIG. 9 offers the same advantages as the cam 55 shown in FIG. 8. In addition, since the recesses are defined in the upper and lower cam surfaces of the cam 56 within the tangential lines L1, the material of the cam 56 may be smaller in quantity than the material of the cam 55, and hence the cost of the cam 56 may be smaller than the cost of the cam 55.

In each of the above embodiments, the biasing mechanism has a pair of upper and lower abutment members 52. However, the biasing mechanism may have a pair of transversely spaced abutment members or a pair of diagonally spaced abutment members with the cam being oriented correspondingly. Furthermore, the biasing mechanism may have a single abutment member. If the biasing mechanism has a single abutment member, then since the moment applied to the cam 54 under the bias of the helical spring 53 differs depending on the direction in which the steering wheel 4 is turned, the abutment member should preferably be kept horizontal and translatable toward and away from the shaft 3, rather than being pivotable about the pivot shaft 51c.

In the embodiment shown in FIGS. 1 through 7A–7C, the cam 54 has the upper and lower arcuate surfaces 54c to provide the neutral range or idling range for the steering wheel 4. Instead of the upper and lower arcuate surfaces 54c on the cam 54, each of the upper and lower abutment members 52 may have an arcuate surface facing the cam 54.

In the above embodiments, the manual control member comprises the steering wheel 4. However, the manual control member may be a manual control rod, for example.

In the embodiment shown in FIGS. 1 through 7A–7C, the cam 54 has the upper and lower arcuate surfaces 54c which are convex radially outwardly. However, if a distinct click-like tactile sensation is to be developed for the game player when the steering wheel 4 reaches the neutral position, then the cam 54 may have flat surfaces or radially inwardly concave surfaces rather than the upper and lower arcuate surfaces 54c. With such flat surfaces or radially inwardly concave surfaces on the cam 54, when the steering wheel 4 reaches the neutral position, the abutment members 52 are brought into substantially face-to-face contact with the cam 54. Because no idling range is available for the steering wheel 4, the game player can have a distinct click-like tactile sensation when the steering wheel 4 reaches the neutral position.

In the above embodiments, each of the cams 54, 55, 56 is horizontally symmetrical with respect to its center. However, the cam of the biasing mechanism is not limited to a horizontally symmetrical shape, but may be of a horizontally asymmetrical shape.

Although certain preferred embodiments of the present invention have been shown and described in detail, it should be understood that various changes and modifications may be made therein without departing from the scope of the appended claims.

What is claimed is:

1. A rotary manual controller for use with a game machine, comprising:

a casing;

a shaft rotatably mounted in said casing for rotation about its own axis;

a manual control member angularly movable with said shaft between a neutral position and a manipulated position, for reflecting a game player's rotary control action in the development of a game played on the game machine;

a biased member concentrically fixedly mounted on said shaft;

abutment means movably supported in said casing for movement in contact with said biased member; and biasing means coupled to said abutment means for biasing said abutment means into contact with said biased member;

said biased member and said abutment means being held in contact with each other through a surface area shaped to develop a click-like tactile sensation for the game player through said manual control member when said manual control member is angularly moved between said neutral position and said manipulated position.

2. A rotary manual controller according to claim 1, wherein said biased member comprises a cam having a cam surface, said surface area comprising an arcuate surface of said cam surface which is convex radially outwardly and extends between spaced corners thereof, said arcuate surface being held in slidable contact with said abutment means.

3. A rotary manual controller according to claim 2, wherein each of said corners comprises an angular corner.

4. A rotary manual controller according to claim 2, wherein said arcuate surface includes a spot which is substantially central on said cam surface transversely across said shaft and is held in contact with said abutment means when said manual control member is positioned in said neutral position.

5. A rotary manual controller according to claim 2, wherein said arcuate surface has an angular extent about the axis of said shaft equally on both sides of a spot which is substantially central on said cam surface transversely across said shaft and is held in contact with said abutment means when said manual control member is positioned in said neutral position.

6. A rotary manual controller according to claim 5, wherein said cam surface includes a pair of flat surfaces extending tangentially from respective ends of said arcuate surface away from each other to said corners, respectively, of said cam surface.

7. A rotary manual controller according to claim 5, wherein said cam surface further comprises a pair of side arcuate facets extending from respective ends of said arcuate surface away from each other, and flat facets extending from respective side arcuate facets to said corners, said side arcuate facets and said flat facets jointly providing recesses in said cam.

8. A rotary manual controller according to claim 1, wherein said abutment means comprises a pair of abutment members spaced from each other and disposed one on each side of said biased member, said biased member comprising a cam having a pair of cam surfaces, said surface area comprising respective arcuate surfaces of said cam surfaces which are convex radially outwardly and extend between spaced corners thereof, said arcuate surfaces being held in slidable contact with said abutment members, respectively.

9. A rotary manual controller according to claim 8, wherein each of said abutment members extends transversely across said shaft and is longer than said cam surfaces, said abutment members being angularly movably supported at ends thereof for pivotal movement about pivot shafts parallel to said shaft, said biasing means comprising a helical spring coupled to and disposed between opposite ends of said abutment members.

10. A rotary manual controller according to claim 8, wherein said abutment members have respective straight surfaces held in slidable contact with said cam surfaces, respectively.

11. A rotary manual controller according to claim 1, further comprising restricting means for restricting angular movement of said shaft.

12. A rotary manual controller according to claim 11, wherein said restricting means comprises a stop lever fixedly mounted on said shaft and a stop lever engaging base mounted in said casing for engaging said stop lever.

13. A rotary manual controller according to claim 1, wherein said manual control member comprises a steering wheel fixedly mounted on an end of said shaft which projects out of said casing.

* * * * *